March 25, 1941. P. O. AHLIN 2,236,305
GARDENING TOOL
Filed July 22, 1939

Inventor
Philip O. Ahlin
By Richard Whiting
Attorney

Patented Mar. 25, 1941

2,236,305

UNITED STATES PATENT OFFICE 2,236,305

GARDENING TOOL

Philip O. Ahlin, Medford, Mass., assignor to Trimstik Company, Newton, Mass., a corporation of Massachusetts Application July 22, 1939, Serial No. 285,933

4 Claims. (Cl. 242—96)

This invention relates to gardening tools, and more specifically to a device especially adapted for use as a guide for cutting tools during the operation of trimming edges of lawns, walks, gardens and the like, and having general utility wherever a straight line indicator is desired in connection with the care of grounds, for instance, in planting and transplanting flowers, vegetables and the like.

The invention is represented in the accompanying drawing, in which.

Figures 1, 2, 3, 4:
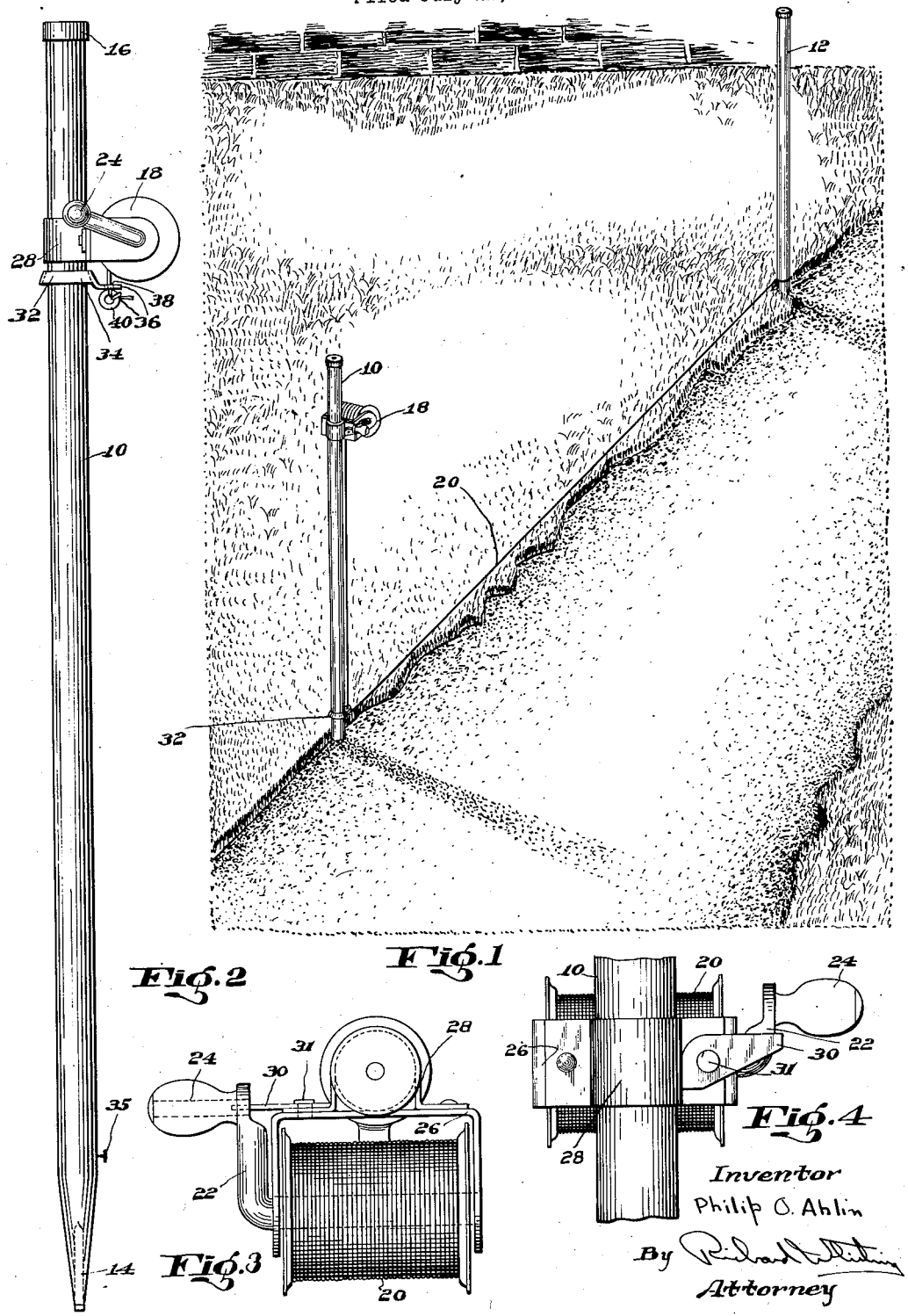
Fig. 1 illustrates the tool of my invention set up for use in the operation of trimming a lawn edge adjacent a walk.
Fig. 2 is a side elevation of one of the stakes shown in Fig. 1.
Fig. 3 is a plan view of the device shown in Fig. 2.
Fig. 4 is a fragmentary rear elevation of the device shown in Fig. 2.

As will be observed from Fig. 1, the tool includes preferably two rigid stakes 10 and 12, which may be 3 to 4 feet in length, and of suitable diameter. As shown, the stake 10 is of substantially uniform diameter, but is tapered at one end to facilitate driving the stake into the ground. The stake 12 is similarly formed. The stakes may be made out of any suitable material which will give sufficient rigidity, but, if made of wood, I prefer to provide each stake with metal reinforcements in the form of a spike 14 at the tapered end and a metal cap 16 at the other end.

The stake 10 has fixedly mounted thereon, adjacent the top end, a rotatable drum 18, on which may be wound a cord or other suitable flexible strand material 20, of such length as may be readily received by the rotatable drum 18. For this purpose, the size of the drum or reel may be varied, according to individual desires. The reel 18 is provided with a crank 22 and handle 24, and is journaled in a frame 26, which is securely held to the stake 10 by a metal strap 28.

For a purpose to be later described, I provide on the frame 26 means which may be utilized to prevent rotation of the drum 18 in one direction. To this end, I provide a movable lever 30 pivotally mounted on the frame 26 on a rivet 31. As shown in Figs. 3 and 4, the lever 30 is adapted to be positioned in the path of rotation of the crank 22, so as to act as a stop on the crank 22 and reel 18 when the reel is rotated in a counterclockwise direction, as viewed in Fig. 2. For this purpose the inner edge of lever 30 is formed as shown in Fig. 4, to move against the surface of the strap 28 as the lever 30 comes into an approximate horizontal position, thereby limiting the pivotal movement of the lever 30 downwardly to provide a stop for the crank 22, and preventing further counterclockwise rotation of the reel.

As illustrated in Fig. 4, the lower edge of the lever 30 is beveled upwardly along its outer portion so that, as the crank is rotated in a clockwise direction, as shown in Fig. 2, the lever 30 will be automatically moved upwardly by the crank 22, to move the lever 30 out of the path of rotation of the crank 22, thereby permitting rotation of the drum in the clockwise direction. In order that the lever will be retained in inoperative position, the lever is mounted relatively tightly so as to be frictionally held in any position against the influence of gravity. The stop means, therefore, must be brought to operative position by manually pivoting the lever 30 about its pivot 31, but will be automatically moved from operative to inoperative position as the crank completes one revolution in the opposite direction, and will be thus retained in inoperative position until again pivoted manually back to operative horizontal position.

The post 10 also carries a guide 32, adapted to guide the strand material 20. In the form shown, this guide comprises an annular portion 34 surrounding the stake 10, and of a diameter slightly greater than that of the stake 10, so as to permit a loose sliding movement of the guide 32 longitudinally of the stake 10. A tack 35 may be driven into the stake 10 near the bottom to retain the guide 32 on the stake. The annular portion 34 carries on one side a lip 36, provided with an aperture 38. As shown, the loose end of the cord 20 is threaded through the aperture 38, and a ring 40 is attached to the loose end of the strand material 20, so as to prevent its passage through the aperture 38 of the guide 32.

Since the diameter of the annular portion 34 of the guide 32 is, as has been explained, slightly larger than that of the stake 10, the guide may be readily adjusted longitudinally of the stake 10 when it is in a plane substantially normal to the axis of the stake 10. However, when the strand material 20 is tightened in a position such as is shown in Fig. 1, the lip 36 of the guide 32 is urged upwardly by the strand material 20, thus tipping the guide 32 out of its position normal to the axis of the stake, and causing the edges of the annular portion 34 to grip the stake and hold the guide in its adjusted position. Generally, during use, the guide 32 will be positioned adjacent the lower end of the stake 10 to lead the cord 20 from the stake 10 at or near the ground level and at a point spaced downwardly from the reel 18.

A further advantage offered by the particular construction of the guide just described is that the guide will automatically adjust itself as the stake moves into the ground, and will not be carried into the ground regardless of the depth of penetration of the stake 10, but will remain just above ground level.

The stake 12 is provided as an anchoring means for the loose end of the strand material 20, as illustrated in Fig. 1.

In use, the stakes 10 and 12 are driven into the ground at the opposite ends of the length to be trimmed. The guide member 32 is then moved down stake 10 to the ground or to any desired height above the ground at which the cord 20 is to be extended and at this time the stop lever 30 is in its inoperative position for free unreeling rotation of the drum 18. The line is then drawn out to stake 12 and secured thereto. The line may then be tightened by winding up the drum 18, after which the stop lever 30 is moved to operative position to hold the line taut.

As will be understood, after use, the tool may readily be converted into compact storage form by pulling up the two stakes and reeling in the line.

My novel garden tool, whose preferred embodiment has been described above, may be modified without departing from the spirit and scope of my invention which is to be limited only as the appended claims require. Thus, one use of my invention which has found favor in the art is for trimming hedges and for that purpose the strand material is extended at a height above the ground corresponding to that desired for the trimmed hedge. My invention contemplates that for unusually high hedges extended stakes may be used. Thus, at the desired interval along the hedge two stakes, both similar to the stake 12, are driven into the ground and the stakes 10 and 12 are lashed to these supporting stakes, to form an extension above them, by the use of suitable straps at the tops of the supporting stakes into which the tapered ends of stakes 10 and 12 may be wedged.

I claim:

1. A gardening tool comprising a rigid stake of substantially uniform configuration throughout a portion of its length, a rotatable element fixedly mounted on said stake for rotation about an axis disposed substantially perpendicular to the axis of said stake, said element including a drum and a manually accessible crank, an annular member having a slightly greater internal dimension than the greatest external dimension of said stake mounted on said stake and having a lip provided with an aperture, said member being movable longitudinally of said stake towards and away from said rotatable element but jamming against said stake when tipped relative thereto, a length of flexible strand material threaded through said aperture and having an end thereof anchored on said drum, and stop means associated with said rotatable element and movable from a position out of the path of said element into its path to prevent rotation of said element in one direction, whereby said strand material may be reeled and unreeled from said drum, and may be led away from said stake from a point thereon spaced from said drum governed by the position of said annular member relative to said stake, which position may become fixed by reason of the tipping of said lip upon tightening said strand.

2. A gardening tool comprising a rigid stake, a rotatable element fixedly mounted on said stake for rotation about an axis disposed substantially perpendicular to the axis of said stake, said element including a drum and a manually accessible crank, a member mounted on said stake and freely movable when said member is disposed normal to the axis of said stake longitudinally thereof towards and away from said rotatable element, but becoming fixed relative to said stake when tipped relative thereto, means associated with said member for restraining a strand material thereagainst while permitting longitudinal movement of said strand material relative to said means, and a length of flexible strand material restrained by said means and having an end thereof anchored on said drum, whereby said strand material may be reeled and unreeled from said drum, and may be led away from said stake from a point thereon spaced from said drum governed by the position of said member relative to said stake, which position may become fixed by reason of the tipping of said member upon tightening said strand.

3. A gardening tool comprising a rigid stake, a rotatable element fixedly mounted on said stake for rotation about an axis disposed substantially perpendicular to the axis of said stake, said element including a drum and a manually accessible crank, a dog pivotally mounted on said stake and movable from a position out of the path of said rotatable element to a position in its path, and an abutment on said stake cooperating with said dog in said latter position to prevent rotation of said rotatable element in one direction, a member mounted on said stake and freely movable by gravity longitudinally thereof away from said rotatable element when said member is disposed coaxial with said stake, but becoming fixed relative to said stake when tipped relative thereto, said member providing a restricted opening, a length of flexible strand material threaded through said opening and having an end thereof anchored on said drum, whereby said strand material may be reeled and unreeled from said drum and may be led away from said stake from a point thereon spaced from said drum governed by the position of said member relative to said stake, which position may become fixed by reason of the tipping of said member upon tightening said strand.

4. A gardening tool comprising a rigid stake, a drum mounted on the stake and rotating about an axis substantially perpendicular to the axis of the stake, a length of strand material adapted to be wound on the drum and attached at one end thereto, a hand crank for rotating the drum, an annular guide for the strand material encircling the stake and having an aperture through which the strand material is freely threaded, the internal diameter of the guide being substantially greater than the diameter of the stake so that the guide can fall down the stake by gravity but become fixed relative to said stake when tipped relative thereto.

PHILIP O. AHLIN.